United States Patent [19]

Sehorn

[11] Patent Number: 4,801,159
[45] Date of Patent: Jan. 31, 1989

[54] ANODELESS RISER ASSEMBLY

[75] Inventor: Bobby W. Sehorn, Shawnee, Okla.

[73] Assignee: Central Plastics Company, Shawnee, Okla.

[21] Appl. No.: 95,556

[22] Filed: Sep. 10, 1987

[51] Int. Cl.⁴ ............................................. F16L 21/02
[52] U.S. Cl. .................................... 285/55; 285/174; 285/286; 285/901
[58] Field of Search .................. 285/47, 55, 286, 174, 285/901, 39

[56] References Cited

U.S. PATENT DOCUMENTS

| | | | |
|---|---|---|---|
| 3,298,716 | 1/1967 | Taylor et al. | 285/55 |
| 4,005,880 | 2/1977 | Anderson et al. | 285/47 |
| 4,284,297 | 8/1981 | Godkin | 285/55 X |
| 4,293,147 | 10/1981 | Metcalfe et al. | 285/39 |
| 4,482,170 | 11/1984 | Jacobson et al. | 285/174 X |
| 4,519,634 | 5/1985 | Hand | 285/55 |
| 4,715,624 | 12/1987 | Frye | 285/55 |

Primary Examiner—Dave W. Arola
Attorney, Agent, or Firm—Laney, Dougherty, Hessin & Beavers

[57] ABSTRACT

An improved gas meter riser assembly that is constructed in a manner that allows all welding to be carried out prior to application of protective coating thereby to maintain uniform epoxy cover. The invention consists of an outer riser pipe having a nipple welded thereon, which nipple is swaged to define a lower neck for insertion within the riser pipe. After welding and coating the nipple/pipe riser casing, an interior plastic pipe having an adaptor insert is fed downward through riser pipe until the adaptor insert is sealingly force-fit down within the swaged lower neck of the nipple. Selected spacers are provided between the plastic pipe and the pipe riser, and the lower end of the pipe riser may be suitably capped through a protective moisture seal.

14 Claims, 2 Drawing Sheets

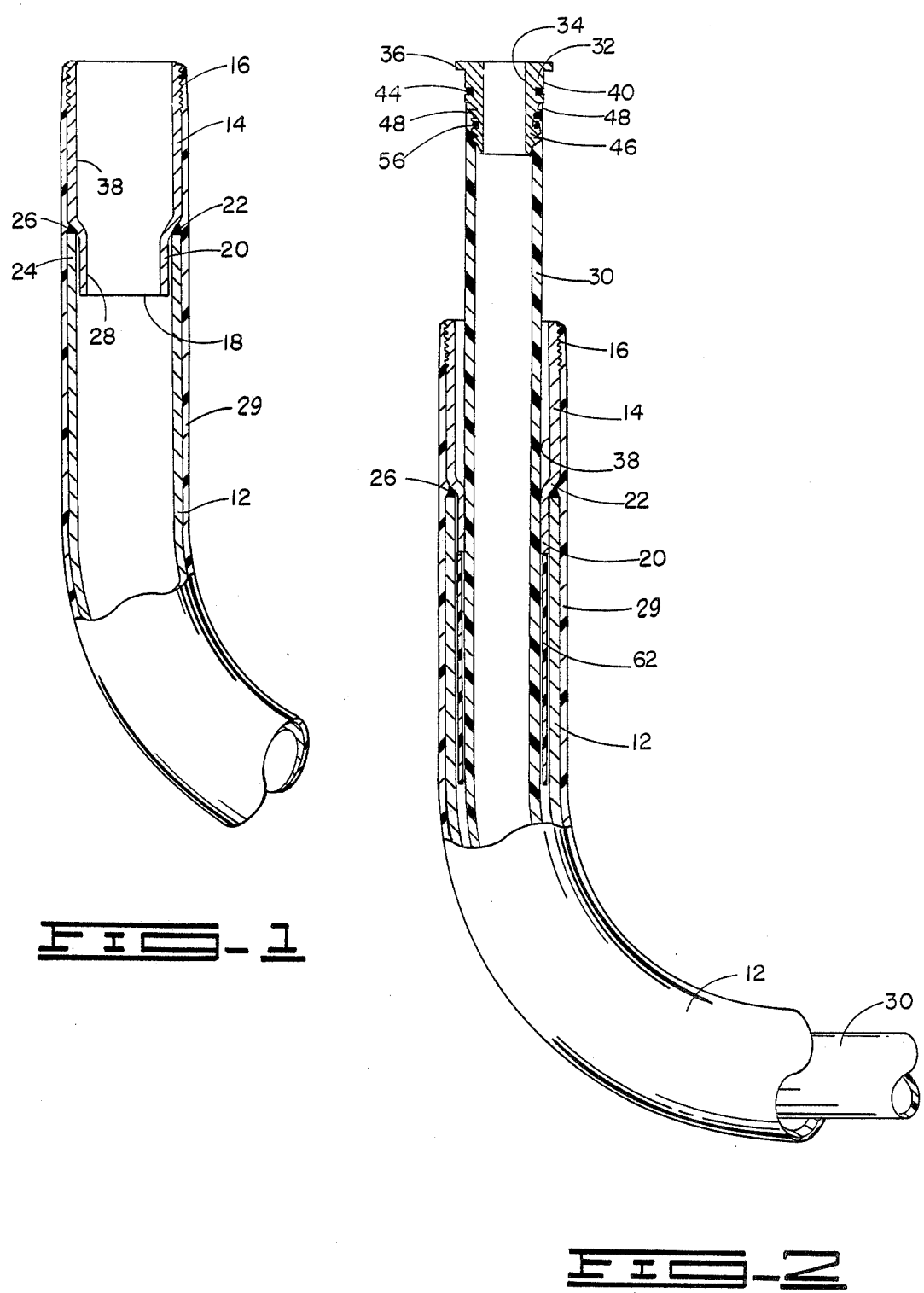

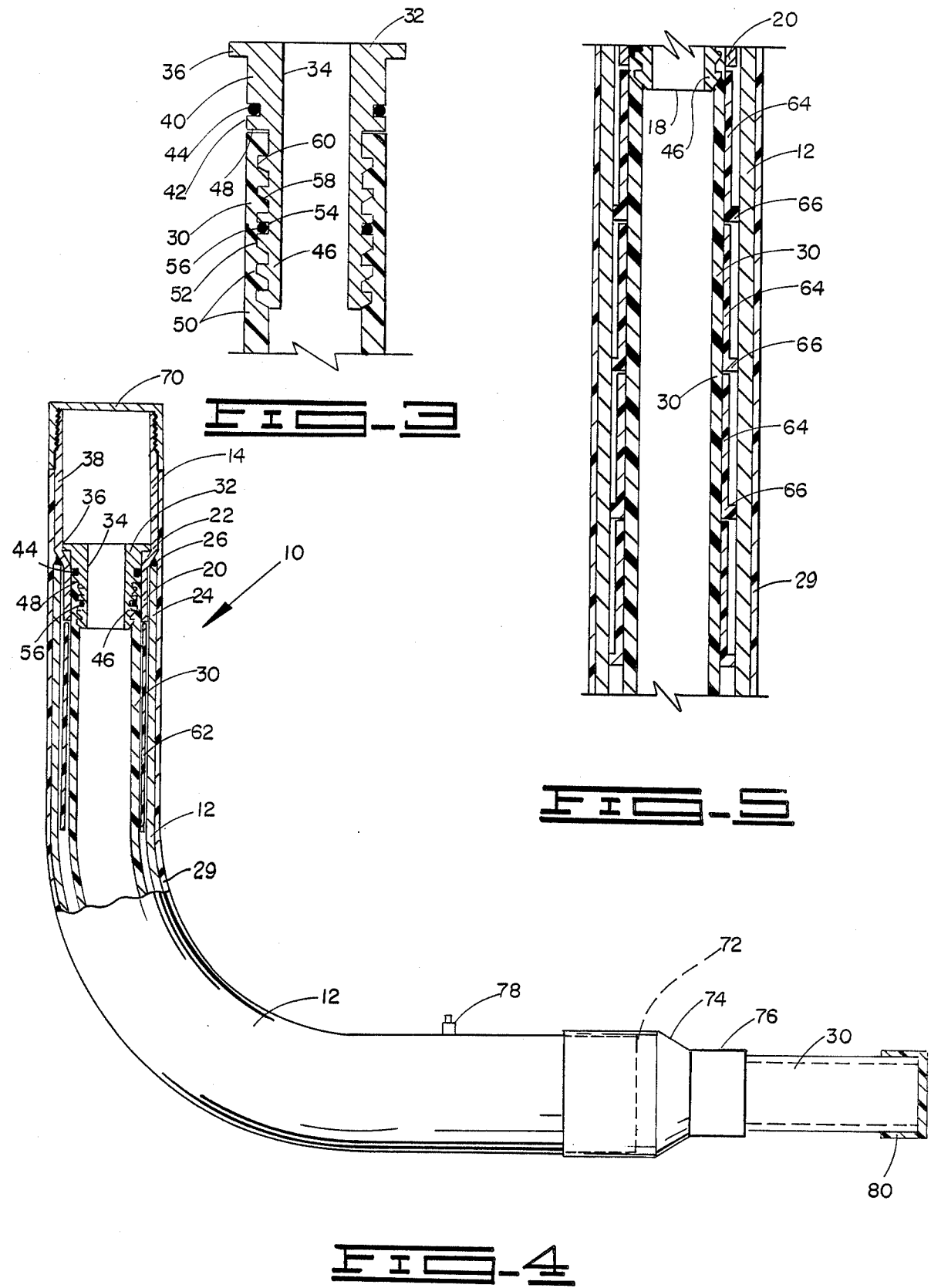

ANODELESS RISER ASSEMBLY

BACKGROUND OF THE INVENTION

1. Field of the Invention

The present invention relates to improvements in anodeless riser assemblies for natural gas conduction and, more particularly, but not by way of limitation, it relates to an improved riser assembly wherein ful assembly, welding and coating of the metal portions of the riser pipe assembly can be carried out for subsequent positioning of plastic pipe components as connected to one or more distribution conduits.

2. Description of the Prior Art

The prior art includes numerous types of gas pipe riser assembly, i.e. a pipe connector for interconnection between the natural gas supply line and an above-ground gas meter. A U.S. Pat. No. 4,293,147 is of interest in that this patent teaches a secure metal-to-plastic coupling wherein a plastic pipe is inserted over a metal adaptor nipple having a series of ring and seal formations whereupon, subsequently, a sleeve member is forced down over the plastic to adaptor ring coupling thereby to bind the coupling in secure, gas-tight manner. This type of coupling, metal-to-plastic, has been particularly utilized in gas meter riser assemblies. Another form of prior riser assembly consists of a metal type nipple welded to a metal gas delivery tube which, in turn, is welded to a metal adaptor. The adaptor receives the plastic gas conduit thereover and is then seized by a suitable compression ring. This assembly is then disposed within a metal riser body which forms the necessary right angle bend for housing of the entire pipe assembly interconnecting the gas meter and the local distribution delivery pipes. This is an effective connection offering advantages of electrical isolation; however, a final weld must be made between the meter nipple and the riser body pipe after coating and this destroys the coating integrity of the riser assembly.

SUMMARY OF THE INVENTION

The present invention relates to an improvement in anodeless gas meter riser assemblies wherein the steel riser pipe body can be first fitted and welded to a swaged nipple and then completely coated with protective polymer for subsequent reception of the plastic gas transmission pipe, a selected number of interpipe spacers and the metal sealing adaptor. The adaptor is then forced into the narrow diameter of the swaged nipple to provide a highly effective, sealed metal-to-plastic connection at about ground level. After such pre-assembly the plastic gas pipe may be further positioned or connected to monitor delivery of gas supply to the local installation.

Therefore, it is an object of the present invention to provide a gas meter riser assembly having uniform coating integrity.

It is also an object of the invention to provide such a riser assembly that is easily installed and reliable in operation.

It is yet further an object of the present invention to provide a metal-to-plastic connection for gas transmission that is a highly reliable assembly with uniform external coating.

Finally, it is an object of the present invention to provide a gas meter riser assembly that can be delivered on site for connection and installation as a uniformly coated product.

Other objects and advantages of the invention will be evident from the following detailed description when read in conjunction with the accompanying drawings which illustrate the invention.

BRIEF DESCRIPTION OF THE DRAWINGS

FIG. 1 is a sectional view in side elevation of the outer metal casing of the riser assembly of the present invention;

FIG. 2 is a sectional view in side elevation of the riser assembly during installation and final seating of the adaptor;

FIG. 3 is an enlarged view in cross-section of the adaptor;

FIG. 4 is a sectional view in side elevation of the riser assembly in final assembly and ready for installation; and FIG. 5 is a sectional view of a portion of the riser assembly showing an alternative form of spacer elements.

DETAILED DESCRIPTION OF THE INVENTION

FIGS. 1, 2, 3 and 4 illustrate the essential structure of the present invention both during initial assembly and in its final assembled form. The riser assembly 10 (FIG. 4) consists of an outer structure made up of a riser pipe 12 as secured to an upper nipple 14. The riser pipe 12 is formed into a right angle bend at a specified bend radius but it should be understood that other angular shapes may be readily formed. The pipe body 12 is preferably formed from steel pipe of requisite dimension. The nipple 14 has threads 16 about the upper end for connection to a gas meter or the like while the bottom end 18 is swaged to form a lesser diameter neck 20 extending from narrowing shoulder 22.

The swaged formation of nipple 40 allows for desirable pre-assembly procedure wherein nipple neck 20 can be inserted down within upper end 24 of riser pipe 12. The riser/nipple combination can then be secured as by weld 26 circumferentially around the assembly as the inside wall 28 of nipple neck 20 defines a critical inside diameter that is important to final assembly of riser assembly 10, as will be further described. After welding of nipple 14 and riser pipe 12, the entire outer surface may then be prepared as by grit blasting or the like and then coated with a uniform epoxy coating 29 in uniform application with no voids or weld spatters therein.

A next phase of the assembly consists of joining an interior plastic pipe 30 and an adaptor insert 32 for subsequent downward insertion of plastic tube 30 down through nipple 14 and riser pipe 12 as shown in FIG. 2. Referring also to FIG. 3, the adaptor insert 32 is formed as a body of revolution having an axial bore 34 and an upper collar 36 with an outside diameter that enables close reception within the upper inside wall 38 of nipple 14 (FIG. 4). The adaptor insert 32 is then reduced to a barrel portion 40 which includes an annular square groove 42 for receiving a sealing O-ring 44. The diameter of barrel portion 40 is of a dimension to be closely received within inside wall 28 of lower neck 20 of nipple 14 (FIG. 4). The diameter of barrel portion 40 is also essentially the same as the outside diameter of the plastic delivery pipe 30.

The adaptor insert 32 is then further reduced in diameter to a lower shank portion 46 which includes a plurality of annular ridges for sealing and gripping purposes within plastic pipe 30. Thus, as plastic pipe 30 is forced over shank portion 46 it encounters a plurality of annular ridges before the pipe end comes into abutment with the lower shoulder 48 of adaptor barrel portion 40. The interfering structures include a plurality of annular tooth ridges 50, a generally flat ridge 52 defining a square groove 54 for containing O-ring 56, an annular tooth ridge 58 and such as a final square ridge 60 proximate the barrel shoulder 48.

After initial assembly of plastic pipe 30 by force fit over shank portion 46 of adaptor insert 32, the opposite end of plastic pipe 30 is guided downward through nipple 14 and riser pipe 12 as shown generally in FIG. 2. A protective sleeve 62 of plastic or the like will have been inserted within riser pipe 12 in surround of plastic pipe 30 either from the lower end of riser pipe 12 or from the top in initial assembly and welding of nipple 14. Top insertion requires that the sleeve 62 be slit longitudinally and collapsed to small diameter for insertion whereupon it expands into position when released. Some code requirements may specify a particular type of spacer sleeve, and by way of example, FIG. 5 illustrates an alternative wherein a plurality of spacer sleeves 64 of specified length and including respective spacer collars 66 are employed serially between riser pipe 12 and plastic pipe 30. Spacer sleeves 64 may be slit and similarly inserted into riser pipe 12.

Referring again to FIG. 2, the plastic pipe 30 is forced downward through riser pipe 12 for eventual seating of adaptor insert 32 within the nipple neck 20 as shown in FIG. 4. The adaptor insert 32 is force fit into the upper end of plastic pipe 30 as stressed in connection over shank portion 46 of adaptor insert 32. The adaptor 32 is then further forced within lower neck 20 of nipple 14 and the collar 36 of adaptor insert 32 is seated firmly down against the inner side of shoulder 22 of nipple 14. In this position, a first sealing ring 56 is disposed between the inner wall of plastic pipe 30 and shank portion 46 of adaptor insert 32, and a second O-ring seal 44 is retained between barrel portion 40 of adaptor insert 32 and the inner wall 28 of nipple lower neck 20 thereby to maintain a rigidly secured and tightly sealed connection for permanent placement. A suitable thread protector cap 70 may then be placed over the upper end of nipple 14.

The lower end or terminus 72 of riser pipe 12 is covered by a suitable moisture seal member 74 formed of plastic or the like, and either threaded or press-fit securely over the terminus of riser pipe 12. The remaining end of moisture seal 74 includes a unitarily formed collar 76 which may be bonded in sealed relationship over the lower end of plastic pipe 30 to maintain sealed concentricity relative to riser pipe 12. A tracer connector 78 may be inserted through the lower extremities of riser pipe 12 as these are often required in gas meter installations. Finally, a cap 80 is secured over the bottom end of plastic pipe 30 and the riser assembly 10 is complete and ready for delivery and installation. The new riser assembly 10 includes steel outer components that are weld secured at or near ground level while also having a totally inclusive epoxy coating without holidays.

The foregoing discloses a novel riser assembly for connecting a gas meter or the like to a gas source line. The assembly provides a steel enclosure for aboveground connection which receives a complete protective epoxy coating after welding of joints thereby to assure a continuous external covering. In addition, the diametric relationships of interior plastic conduit, adaptor insert and nipple configuration assure a very secure, gas-tight seal upon final assembly.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A riser assembly for gas meter connection comprising:
    an outer pipe body formed as a first portion have a terminus for underground disposition and an angularly bent riser portion;
    nipple means for meter connection secured within said outer pipe body riser portion and defining a critical inside diameter;
    adapter means having an axial bore and a collar poriton having an outside diameter that enables close reception within said nipple means, and extending into a shank portion of diameter less than said critical inside diameter and including a plurality of gripping ridges formed peripherally therearound; and
    plastic pipe of selected length having outside diameter of a size to be closely received through said critical inside diameter and being tightly secured over said adapter means shank portion and gripping ridges;
    whereby said assembled plastic pipe and adapter means can be slidingly inserted through and nipple means and outer pipe body until said adapter means with plastic pipe is seated inside of said nipple means.

2. A riser assembly as set forth in claim 1 which is further characterized in that:
    said adapter means includes a barrel portion of a diameter to be sealingly received within the critical inside diameter of said nipple means.

3. A riser assembly as set forth in claim 2 which is further characterized to include:
    a sealing ring contained between said adaptor means barrel portion and said nipple means to seal said adaptor means inside of said nipple means.

4. A riser assembly as set forth in claim 2 which is further characterized to include:
    a protective sleeve inserted between the outer pipe and said plastic pipe adjacent said nipple means.

5. A riser assembly as set forth in claim 4 wherein said protective sleeve comprises:
    a plastic spacer tube of selected lengths and diameter.

6. A riser assembly as set forth in claim 4 wherein said protective sleeve comprises:
    a plurality of cylindrical spacers arrayed serially.

7. A riser assembly as set forth in claim 1 which is further characterized to include:
    a sealing ring contained between said adaptor means and said nipple means to seal said adaptor means inside of said nipple means.

8. A riser assembly as set forth in claim 1 which further includes:
    a moisture seal cap having a first collar of diameter to be sealingly received over the terminus of the outer pipe first portion and a second end having a second collar for receiving tight passage of said plastic pipe therethrough for external connection.

9. A riser assembly as set forth in claim 1 which is further characterized to include:
a sealing ring contained between said adaptor means and said plastic pipe to seal said plastic pipe over said adaptor means.

10. A riser assembly as set forth in claim 1 wherein:
said nipple means is a swaged pipe section having large and small diameter ends with the small diameter end inserted in said outer pipe body and with the large diameter end threaded to receive meter connection.

11. A riser assembly as set forth in claim 10 wherein:
said nipple means is circumferentially welded to said outer pipe body.

12. A riser assembly as set forth in claim 11 wherein:
said circumferential welding is effected prior to insertion of said plastic pipe and adaptor means.

13. A riser assembly as set forth in claim 12 wherein:
said assembly is entirely covered by a uniform epoxy coating.

14. A riser assembly as set forth in claim 1 wherein:
said assembly is entirely covered by a uniform epoxy coating.

* * * * *

UNITED STATES PATENT AND TRADEMARK OFFICE
CERTIFICATE OF CORRECTION

PATENT NO. : 4,801,159

DATED : January 31, 1989

INVENTOR(S) : Bobby W. Sehorn

It is certified that error appears in the above-identified patent and that said Letters Patent is hereby corrected as shown below:

Column 4, line 14, delete the word "have" and substitute the word --having-- therefor;

Column 4, lines 20 and 21, delete the word "poriton" and substitute the word --portion-- therefor;

Column 4, line 33, delete the word "and" and substitute the word --said-- therefor; and Column 4, line 53, delete the word "lengths" and substitute the word --length-- therefor.

Column 4, line 20, "adapter" should read -- adaptor --.

Signed and Sealed this

Fourth Day of July, 1989

Attest:

DONALD J. QUIGG

Attesting Officer

Commissioner of Patents and Trademarks